United States Patent
Gismervik et al.

(10) Patent No.: US 11,428,566 B2
(45) Date of Patent: Aug. 30, 2022

(54) LEVEL SENSOR ASSEMBLY

(71) Applicant: SENTEC AS, Laksevåg (NO)

(72) Inventors: Øystein Gismervik, Bjørndalstræ (NO); Jørn R. Sandø, Rådal (NO); Torsten Artz, Bergen (NO)

(73) Assignee: SENTEC AS, Laksevåg (NO)

( * ) Notice: Subject to any disclaimer, the term of this patent is extended or adjusted under 35 U.S.C. 154(b) by 282 days.

(21) Appl. No.: 16/650,367

(22) PCT Filed: Oct. 3, 2018

(86) PCT No.: PCT/NO2018/050237
§ 371 (c)(1),
(2) Date: Mar. 24, 2020

(87) PCT Pub. No.: WO2019/070130
PCT Pub. Date: Apr. 11, 2019

(65) Prior Publication Data
US 2020/0232840 A1    Jul. 23, 2020

(30) Foreign Application Priority Data
Oct. 5, 2017   (NO) .................................. 20171589

(51) Int. Cl.
*G01F 23/72* (2006.01)
*F01N 3/20* (2006.01)

(52) U.S. Cl.
CPC ........... *G01F 23/72* (2013.01); *F01N 3/2066* (2013.01); *F01N 2610/02* (2013.01);
(Continued)

(58) Field of Classification Search
CPC ........ G01F 23/72; G01F 23/74; F01N 3/2066; F01N 3/208; F01N 3/2875;
(Continued)

(56) References Cited

U.S. PATENT DOCUMENTS

| | | | |
|---|---|---|---|
| 9,297,686 B1* | 3/2016 | Ross, Jr. | ................ G01F 23/292 |
| 2007/0196243 A1* | 8/2007 | Osaku | ................... F01N 3/2066 |
| | | | 422/400 |

(Continued)

FOREIGN PATENT DOCUMENTS

| | | |
|---|---|---|
| CN | 204591423 U | 8/2015 |
| DE | 102010039495 A1 | 2/2012 |

(Continued)

*Primary Examiner* — Alexander A Mercado
(74) *Attorney, Agent, or Firm* — Flener IP & Business Law; Zareefa B. Flener

(57) ABSTRACT

A level sensor assembly (10) for measuring physical properties indicative of a quality of a urea solution (AdBlue/DEF), where at least a portion of said level sensor assembly (10) is inserted in a tank (50), said level sensor assembly (10) comprises a header unit (12) mounted in an aperture of the tank (50); heating tubes (20) inserted in the tank for heating/thawing the urea solution in the tank (50) and one or more tubes (22) for suction of urea solution from the tank (50), said tubes (20,22) being connected to the header unit (12); and a level sensor (24,26) for measuring level of urea solution in the tank (50). Further, a detachable UQS sensor (30) is installed in the header unit (12), said UQS sensor (30) being at least partly submerged in a liquid pool (32) of urea solution in the header unit (12), and the liquid pool (32) in the header unit (12) comprises a compressible and/or expanding bottom (34).

10 Claims, 3 Drawing Sheets

(52) U.S. Cl.
CPC .. *F01N 2610/10* (2013.01); *F01N 2610/1406* (2013.01); *F01N 2610/148* (2013.01); *F01N 2900/1818* (2013.01)

(58) Field of Classification Search
CPC ........... F01N 2560/12; F01N 2560/026; F01N 2610/02; F01N 2610/10; F01N 2610/107; F01N 2610/1406; F01N 2610/142; F01N 2610/148; F01N 2610/1486; F01N 13/008; F01N 2900/1818; Y02T 10/12
See application file for complete search history.

(56) References Cited

U.S. PATENT DOCUMENTS

| | | | |
|---|---|---|---|
| 2007/0202019 A1* | 8/2007 | Nishina | F01N 3/2066 422/163 |
| 2012/0186334 A1 | 7/2012 | Steinhauser et al. | |
| 2013/0220467 A1* | 8/2013 | Ristovski | F16L 55/00 138/104 |
| 2014/0150538 A1* | 6/2014 | Gloeckle | F01N 11/00 73/64.47 |
| 2016/0123929 A1 | 5/2016 | Op De Beeck et al. | |
| 2018/0371977 A1* | 12/2018 | Brück | B60K 13/04 |
| 2020/0191032 A1* | 6/2020 | Collura | F01N 9/00 |
| 2021/0220764 A1* | 7/2021 | Azuma | E02F 9/00 |

FOREIGN PATENT DOCUMENTS

| | | |
|---|---|---|
| JP | 2017104084 A | 6/2017 |
| WO | 2014037144 A1 | 3/2014 |
| WO | 2017077448 A1 | 5/2017 |

* cited by examiner

LEVEL SENSOR ASSEMBLY

FIELD OF THE INVENTION

The invention relates to a level sensor assembly for measuring physical properties indicative of a quality of a urea solution (AdBlue/DEF), where at least a portion of said level sensor assembly is inserted in a tank, said level sensor assembly comprises a header unit mounted in an aperture of the tank, heating tubes inserted in the tank for heating or thawing the urea solution in the tank and one or more tubes for suction of urea solution from the tank, said tubes being connected to the header unit, and a level sensor for measuring level of urea solution in the tank.

The present invention relates to an integrated Urea concentration (/AdBlue quality) sensor (UQS) and a tank level sensor, which preferably also can be assembled from separate modules. The tank level sensor comprises amongst other the level sensor, suction and return of liquid in an AdBlue tank. The UQS comprises amongst other the sensor unit with integrated electronics.

BACKGROUND OF THE INVENTION

Stricter emission requirements for Diesel engines in the automotive industry, normally requires the use of an SCR (Selective Catalytic Reduction) system. The Catalytic liquid used, is normally referred to as AdBlue or Diesel Electric Fluid (DEF). The EURO VI norm specifies that the quality of AdBlue/DEF is monitored on-board the vehicle. A standard AdBlue tank sensor normally monitors the tank level and can be combined with a Urea Quality Sensor (UQS) normally fixated on the part of the sensor that is submerged. In today's versions, due to the severely integrated quality and level sensor, this requires a complete change out of the combined unit in case there is a failure either in the level or quality detection system. Secondly, cost of development, integration and sourcing becomes expensive. Thirdly, a UQS mounted in-tank often experience interference from or formation of bubbles on or nearby the sensor surface in the tank, distorting the readings.

DISCLOSURE OF THE STATE OF ART

Devices for metering concentrations of urea solution are known

DE 19850799 A1 disclose an apparatus for measuring quality of a solution into which at least a portion of said apparatus is inserted in operation, and the apparatus includes a configuration of sensors, for measuring mechanical and electrical properties within a volume of a urea solution.

DE 19706486 A1 discloses sensors for measuring electrical and mechanical properties of a fluid in order to assess its quality.

EP2517004 A1 discloses an apparatus for measuring quality of a urea solution and is operated with at least a portion of the apparatus inserted into the urea solution. The apparatus includes a configuration of sensors for measuring mechanical and electrical properties within a volume of the urea solution, the measurements of mechanical and electrical properties being mutually differently influenced by components present in the urea solution. A data processing arrangement of the apparatus is operable to process the measurements of mechanical and electrical properties for generating output data indicative of a quality of the urea solution. The apparatus is also capable of being adapted to measure qualities of other types of solution.

U.S. Pat. No. 9,297,686 B1 discloses an apparatus for determining at least first and second properties of a fluid associated with a tank includes a mounting head adapted for connection to the tank, a housing extending from the mounting head, and an integral chamber formed in the housing. The chamber is in fluid communication between the tank and a down-line device of the vehicle or equipment with which the tank is associated. A sensor module can be installed in the chamber for measuring different parameters of the fluid. Other modules can be interchanged with the sensor module for accomplishing different operations associated with the apparatus and/or fluid.

US 2016123929 A1 discloses a device to measure a quality of a urea solution of a vehicle urea tank or of a urea solution coming from a tank, includes a chamber, at least one ultrasonic transceiver configured to vertically emit an ultrasonic wave in the chamber, and a deflector extending in the chamber above the transceiver. The chamber includes an inlet for filling the chamber with a urea solution so that a level of the urea solution in the chamber reaches at least the deflector.

CN 204591423 U discloses an integrated urea quality detecting's urea case, including urea case main part and install the level sensor in this urea case main part, level sensor signal output part is connected with control system, be equipped with urea quality sensor in the urea case main part, urea quality sensor signal output is connected with control system. The quality with regulation and control urea solution through quality sensor and level sensor output signal integration is judged through signal output part with signal output to control system, realization accuracy to the mode of the integrated urea quality sensor of urea case adoption. Can detect in strict accordance with national standard's requirements for quality, execute relevant national policy, the purity that can survey and adjust urea solution moreover in real time, effective control SCR system protects the environment healthily to the processing of pollutants such as NOx.

JP 2017104084 A discloses a combine equipped with an engine, a fuel tank for storing fuel of the engine, a reaping device, a thresher, and a grain tank includes: an exhaust gas purification case for removing nitrogen oxide in the exhaust gas of the engine; a reductant tank for storing reductant supplied to the exhaust gas purification case, and a display unit for displaying a residual fuel amount display according to the residual fuel amount in the fuel tank, and a residual reductant amount display according to the residual reductant amount in the reductant tank on a display screen side by side.

US 2013220467 A1 discloses an automotive selective catalytic reduction (SCR) system assembly includes a holder for receiving an SCR system sensor. The holder has a tube, a chamber, and a retainer. The tube receives incoming fluid from a first SCR line and leads exiting fluid to a second SCR line. A passage is located in the tube. The chamber has an interior for receiving the SCR system sensor, and has an opening. The retainer has a portion moveable in and out of the chamber's opening for holding and releasing the SCR system sensor in the chamber's interior.

OBJECTS OF THE PRESENT INVENTION

It is an object to provide a UQS device, which can be positioned outside of the DEF/AdBlue tank and preferably integrated as a detachable unit in the level sensor head. The modular design can allow for using a close to standard serial produced UQS, but possibly with marginal modifications. The Urea Level sensor head design can be designed to fully integrate the UQS detachable unit. The sensor can continuously detect quality of the flowing DEF/AdBlue liquid directed to the quality sensor. The DEF/AdBlue liquid could be all or a portion of the circulating liquid returning from (/or fed to the) SCR system.

The sensor can be positioned in the sensor head in conjunction with the return/feed flow of DEF/AdBlue measuring urea concentration in a liquid. The sensor is partly or completely submerged in a pocket/liquid pool containing DEF/AdBlue, which will be designed to handle liquid/solid expansion due to icing scenarios.

The pocket or parts of the pocket containing liquid (DEF/AdBlue) can have a geometry allowing liquid expansion or additionally consist of a flexible material allowing expansion/compression and possibly whereas a spring device can be installed on the outside or inside of the flexible material ensuring fully retraction or extraction of the elastic material. The pocket is part of the enclosed circuit returning or feeding DEF/AdBlue to the tank or to the SCR system.

The pocket or parts of the pocket containing liquid (DEF/AdBlue) can have a geometry allowing liquid expansion in addition to the liquid discharge port, wherein the bottom can be equipped with a small drainage hole enabling the liquid (DEF/AdBlue) completely to drain into the tank after system shutdown. The draining capacity will be significantly less than the minimum amount of liquid (DEF/AdBlue) normally directed to the pocket.

The pocket or parts of the pocket containing liquid (DEF/AdBlue) can have a geometry allowing liquid expansion or additionally consist of a flexible material allowing expansion/compression and having a small drainage hole enabling the liquid (DEF/AdBlue) completely to drain into the tank after system shutdown.

Key is simplicity in installation and later replacing or servicing the UQS, by not having to dismantle the complete DEF/AdBlue sensor assembly from the tank.

Advantages with the technology can be summarized as follows:
a) Close to serial manufactured "standard" parts can be combined to perform this job.
b) Easy to install; and no requirements calling for a heavy specification of a submerged electronic part in an intrusive fluid.
c) Exposure to air bubble formation on sensor surface or in the liquid is significantly reduced.
d) The quality sensor unit is easy to replace in case of a malfunction.
e) Allows for earlier start in detecting/sensing the quality of AdBlue/DEF in case of a frozen tank compared to in-tank UQS solutions.
f) Expandable/compressible pocket/liquid pool or pocket design (including possible drainage hole) will ensure that the UQS unit or the sensor head will not be damaged due to icing. Adding the drainage function will eliminate the necessity for thawing the frozen AdBlue/DEF surrounding the UQS sensor.

SUMMARY OF THE INVENTION

At least some of the above objectives are achieved by having the UQS integrated in the header of the level sensor by means of modular design, said sensor comprises an UQS and a level sensor based on REED switches or AMR technology activated by a magnetic float. Data collected by the sensors are transmitted to the vehicle OBD system. Whereas the level sensor also comprises header unit, stainless steel tubes for heating/thawing AdBlue/DEF, suction, and return. Typical data provided by the sensors would be measurement of percentage Urea in solution, temperature of DEF/AdBlue and liquid level in tank.

Said UQS module can be combined with different executions AdBlue sensors utilized by the different OEMs and includes headers made from PA66-GF33, alternatively rubber or variants/alternatives to these materials and/or combined with metal structures. The modular design will allow for easy installation and replacement of the UQS.

The invention is allowing the UQS to detect quality by only having its detector submerged in a liquid pool in the sensor header and not in the tank.

The above objects are achieved with a level sensor assembly for measuring physical properties indicative of a quality of a urea solution (AdBlue/DEF), where at least a portion of said level sensor assembly is inserted in a tank, said level sensor assembly comprises a header unit mounted in an aperture of the tank, heating tubes inserted in the tank for heating/thawing the urea solution in the tank and one or more tubes for suction of urea solution from the tank, said tubes being connected to the header unit, and a level sensor for measuring level of urea solution in the tank, wherein a detachable UQS sensor is installed in the header unit, said UQS sensor being at least partly submerged in a liquid pool of urea solution in the header unit, wherein the liquid pool in the header unit comprises a compressible and/or expanding bottom.

The liquid pool in the header unit can be a liquid pool of return urea solution to the tank. Further, the liquid pool in the header unit can be connected to an inlet for return urea solution and an overflow discharge of urea solution from the liquid pool into the tank.

The bottom can comprise one or more elastic cups made of elastic material, said elastic cups are expandable during formation of ice in the liquid pool and retractable when the ice melts.

Alternative, the bottom can comprise one or more elastic cups made of compressible material, said elastic cups are compressible during formation of ice in the liquid pool and expandable when the ice melts.

The liquid pool in the header unit may further comprise a drainage hole for drainage of urea solution into the AdBlue tank when not in use.

Alternative, the liquid pool in the header unit can be a liquid pool of filling urea solution to the tank. The liquid pool in the header unit may also be a liquid pool of urea solution to be feed to a SCR system.

The compressible and/or expanding bottom can comprise a spring.

The level sensor can comprise a tube with REED switches or AMR technology, which is activated by a magnetic float.

DESCRIPTION OF THE DIAGRAMS

Embodiments of the present invention will now be described, by way of example only, with reference to the following diagrams wherein.

DESCRIPTION OF PREFERRED EMBODIMENTS OF THE INVENTION

Figure 3:
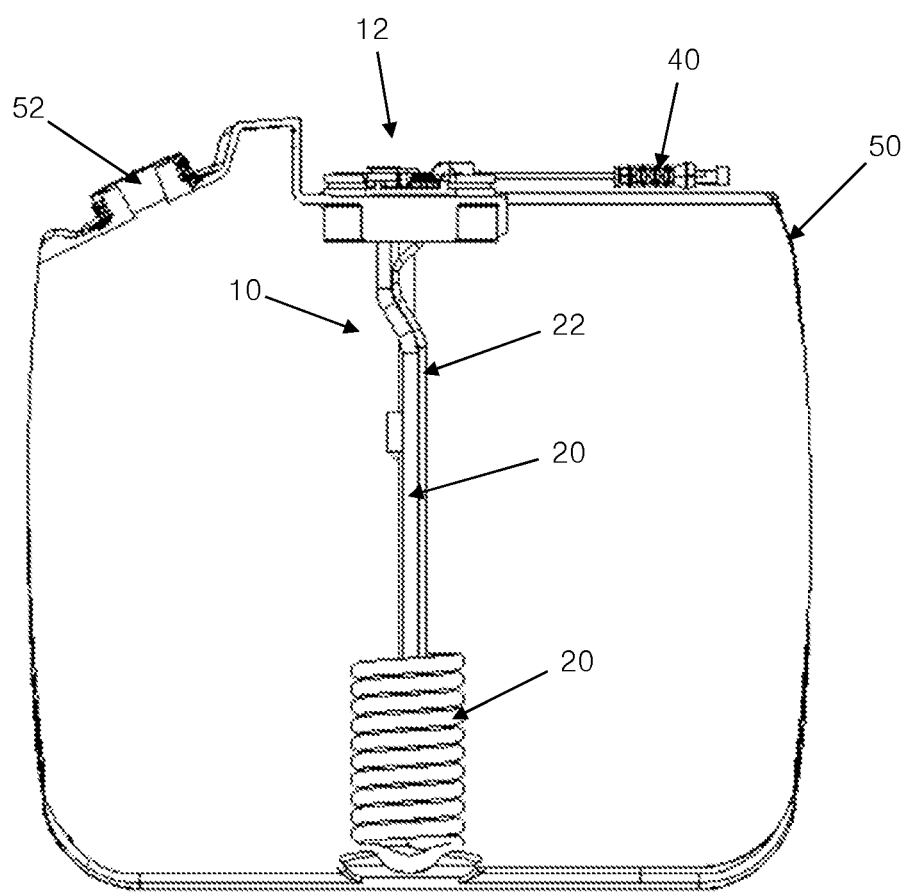
FIG. 3 shows example of a complete a level sensor assembly according to the invention mounted in a tank.

FIG. 3 shows a typical AdBlue tank 50 equipped with a level sensor assembly 10 according to the invention, in where the level sensor assembly 10 is arranged for measuring physical properties indicative of a quality of a urea solution (AdBlue/DEF). The tank 50 further comprises an inlet or opening 52 for filling of the urea solution. At least a portion of said level sensor assembly 10 is inserted in the tank 50, and a header unit 12 of the level sensor assembly 10 is mounted in an aperture at the top of the tank 50 and extends out of the aperture. The header unit 12 is equipped with a connector 40 for forwarding signals for level measuring and a connector 42 for forwarding signals for AdBlue quality measuring. The level sensor assembly 10 is further connected to a SCR (Selective Catalytic Reduction) system of a vehicle.

Design and material composition of header structure may vary from OEM to OEM.

Figure 2:
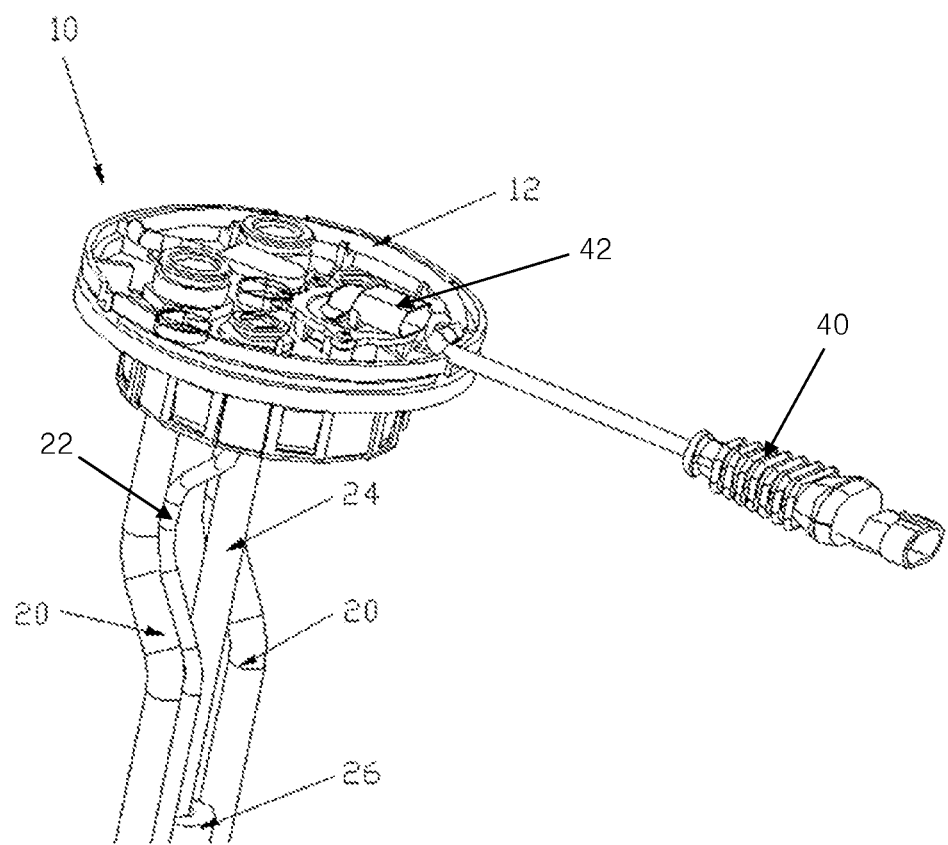
FIG. 2 shows a perspective view of the upper part with the head of the level sensor assembly according to the invention.

The level sensor assembly 10 further comprises in a known way heating tubes 20 inserted in the tank for heating or thawing the urea solution in the tank 50 and one or more tubes 22 for suction of urea solution from the tank 50, said tubes 20,22 being connected to the header unit 12. FIG. 2 shows an example of heating tubes 20 with coils, but many other designs are possible.

The level sensor assembly 10 further comprises in a known way a level sensor for measuring level of urea solution in the tank 50, and which is connected to the connector 40 for forwarding signals for level measuring. The level sensor can comprise a tube 24 with REED switches or AMR technology, which is activated by a magnetic float 26. FIG. 2 shows such an example of a level sensor, but many other designs are possible.

A main feature of the invention is that a detachable urea quality sensor 30, hereafter called UQS sensor, is installed in the header unit 12, wherein the UQS sensor 30 is being at least partly submerged in a pocket or liquid pool 32 of urea solution in the header unit 12. The UQS sensor 30 is inserted in an opening, by screwing or otherwise fastened, in the header unit 12 such that it is directly above and in contact with the liquid pool 32 of urea solution.

The UQS sensor 30 can be a sensor using special optical techniques for detecting variances in urea concentration, for instance as small as +/−2%, and can operate at temperatures from for instance −10 C.° to +85 C°. The optical measurement principle is robust against dirt and moving fluids including gasoline, diesel or coolant. The sensor enables continuous measurement of AdBlue/DEF-quality (proportion of urea in the solution or wrong medium).

The liquid pool 32 in the header unit 12 is normally a liquid pool of return urea solution (returning from the SCR system) to the tank 50, and has or is connected to an inlet 36 for return urea solution and an overflow discharge 38 of urea solution from the liquid pool 32 into the AdBlue tank 50.

A typical AdBlue tank 50 is mounted on the outside of a vehicle, normally next to the fuel tank, and the urea solution is therefore subjected to ice formation and/or freezing. In case the urea solution freezes is thus preferable to equip the liquid pool 32 in the header unit 12 with a compressible and/or expanding bottom 34, thus allowing liquid expansion.

The bottom 34 may additionally consist of a flexible material allowing expansion or compression and possibly whereas a spring or similar can be installed on the outside or inside of the flexible material ensuring fully retraction or extraction of the elastic material. Thus, the bottom 34 may comprise one or more elastic cups 34a,34b. The elastic cups 34a,34b are preferable made of elastic or compressible material, which when not affected goes back to its original form. The spring can be used as an extra means to ensure extraction or compression of the elastic cups 34a,34b back to the original form.

Figure 1:
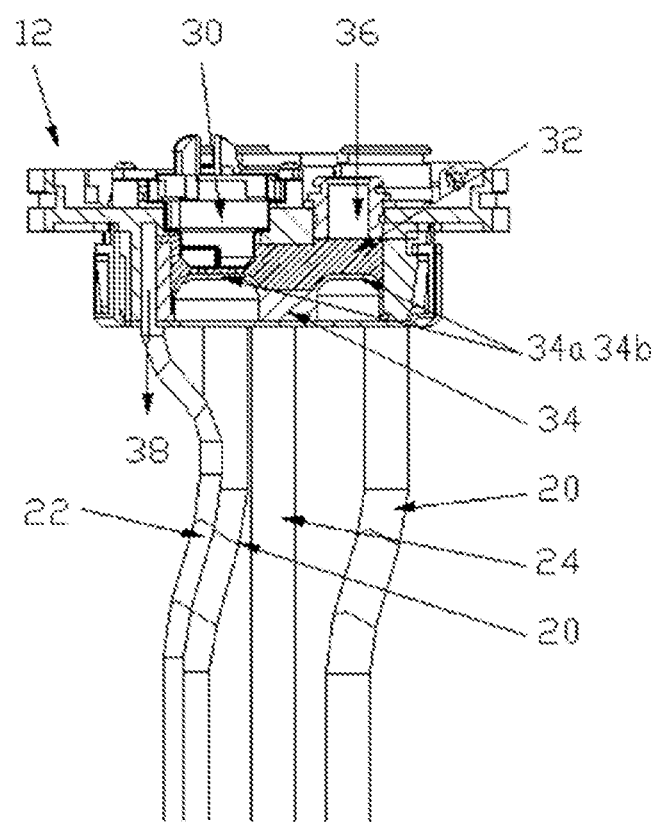
FIG. 1 shows in cross section an upper part and a head of a level sensor assembly according to the invention.

As shown in FIG. 1 the elastic cups 34a,34b are placed upside down, i.e. with the bottom facing upward.

In one embodiment the elastic cups 34a,34b are made of compressible material and are arranged to be compressed in case of formation of ice in the liquid pool 32 and to expand when the ice melts.

However, in a second embodiment, the elastic cups 34a, 34b are made of elastic material and are arranged to be expandable in case of formation of ice in the liquid 32 pool and to retract when the ice melts.

The elastic material provides that the flexible bottom 34 expand to take into account the increased volume of the ice. If the material is compressed during icing, it will be the wall thickness or the compressible material in the liquid pool 32 that is compressed to provide extra space during icing.

In addition to the overflow discharge 38, the liquid pool 32 in the header unit 12 can comprise a drainage hole (not shown) for drainage of urea solution into the AdBlue tank 50 when not in use. The overflow discharge 38 and the drainage hole can be combined or integrated with each other.

In alternative embodiments (not shown) and if possible to maintain sufficient through flow of liquid, the liquid pool 32 in the header unit 12 can be a liquid pool of filling urea solution to the tank, i.e. that the inlet opening 52 of the tank 50 is connected to the header unit 12 or that the urea solution is poured into the tank through the header unit 12. It is also possible that the liquid pool 32 in the header unit 12 can be a liquid pool of urea solution to be feed to the SCR system, thus insuring the quality of the urea solution to the SCR system.

The invention claimed is:

1. A level sensor assembly for measuring physical properties indicative of a quality of a urea solution, where at least a portion of said level sensor assembly is inserted in a tank, said level sensor assembly comprises:
  a header unit mounted in an aperture of the tank,
  heating tubes inserted in the tank for heating or thawing the urea solution in the tank and one or more tubes for suction of urea solution from the tank, said tubes being connected to the header unit, and
  a level sensor for measuring level of urea solution in the tank,
  a detachable urea quality sensor is installed in the header unit, said urea quality sensor being at least partly submerged in a liquid pool of urea solution in the header unit, wherein
  the liquid pool in the header unit comprises a compressible and/or expanding bottom.

2. The level sensor assembly according to claim 1, wherein the liquid pool in the header unit is a liquid pool of return urea solution to the tank.

3. The level sensor assembly according to claim 2, wherein the liquid pool in the header unit is connected to an inlet for return urea solution and an overflow discharge of urea solution from the liquid pool into the tank.

4. The level sensor assembly according to claim 1, wherein the bottom comprises one or more elastic cups made of elastic material, said elastic cups are expandable during formation of ice in the liquid pool and retractable when the ice melts.

5. The level sensor assembly according to claim 1, wherein the bottom comprises one or more elastic cups made of compressible material, said elastic cups are compressible during formation of ice in the liquid pool and expandable when the ice melts.

6. The level sensor assembly according to claim 1, wherein the liquid pool in the header unit comprises a drainage hole for drainage of urea solution into the tank.

7. The level sensor assembly according to claim 1, wherein the liquid pool in the header unit is a liquid pool of filling urea solution to the tank.

8. The level sensor assembly according to claim 1, wherein the liquid pool in the header unit is a liquid pool of urea solution to be feed to a Selective Catalytic Reduction system.

9. The level sensor assembly according to claim 1, wherein the compressible and/or expanding bottom comprises a spring.

10. The level sensor assembly according to claim 1, wherein the level sensor comprises a tube with reed switches, which are activated by a magnetic float.

* * * * *